United States Patent
Esaki et al.

(10) Patent No.: US 10,885,016 B2
(45) Date of Patent: Jan. 5, 2021

(54) SYSTEM, CLIENT DEVICE, SERVER DEVICE, AND PROGRAM

(71) Applicants: Kabushiki Kaisha Toshiba, Minato-ku (JP); Toshiba Digital Solutions Corporation, Kawasaki (JP)

(72) Inventors: Yuichiro Esaki, Shinagawa (JP); Kazuya Hashimoto, Kawasaki (JP); Seiichiro Tanaka, Koshigaya (JP); Yuuichi Handa, Setagaya (JP); Shun Enari, Kunitachi (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 647 days.

(21) Appl. No.: 15/694,291

(22) Filed: Sep. 1, 2017

(65) Prior Publication Data
US 2018/0067983 A1  Mar. 8, 2018

(30) Foreign Application Priority Data
Sep. 6, 2016  (JP) .................. 2016-173813

(51) Int. Cl.
*G06F 16/23* (2019.01)
*G06F 16/2458* (2019.01)
(Continued)

(52) U.S. Cl.
CPC ...... *G06F 16/2365* (2019.01); *G06F 16/2477* (2019.01); *G06F 16/24578* (2019.01); *H04L 67/42* (2013.01); *G06F 3/0481* (2013.01)

(58) Field of Classification Search
CPC ............ G06F 16/2365; G06F 16/2477; G06F 16/24578; G06F 3/0481; H04L 67/42
See application file for complete search history.

(56) References Cited

U.S. PATENT DOCUMENTS

| 6,070,184 | A  | 5/2000 | Blount et al. |
| 7,175,079 | B1 | 2/2007 | Silverbrook et al. |

(Continued)

FOREIGN PATENT DOCUMENTS

| EP | 1 244 006 A1 | 9/2002 |
| JP | 10-207699 A | 8/1998 |

(Continued)

OTHER PUBLICATIONS

Office Action dated Aug. 6, 2019 in Japanese Patent Application No. 2016-173813, 6 pages (with machine English translation obtained by the Global Dossier).

(Continued)

*Primary Examiner* — Matthew J Ellis
(74) *Attorney, Agent, or Firm* — Oblon, McClelland, Maier & Neustadt, L.L.P.

(57) ABSTRACT

According to one embodiment, a client device includes a first rule storage unit, a first check execution unit, a user interface control unit, a request transmission unit, and a rule update unit. The rule update unit requests a server device to transmit a rule for updating the first rule storage unit on the basis of a predetermined trigger and updates the first rule storage unit by using the rule transmitted from the server device as a response to the request. The server device has a client rule generation unit. The client rule generation unit generates the client rule to transmit the generated client rule to the client device of a request source when a rule request is received from the rule update unit.

7 Claims, 14 Drawing Sheets

(51) Int. Cl.
  *G06F 16/2457* (2019.01)
  *H04L 29/06* (2006.01)
  *G06F 3/0481* (2013.01)

(56) References Cited

U.S. PATENT DOCUMENTS

| | | |
|---|---|---|
| 2002/0199183 A1 | 12/2002 | Taniguchi |
| 2006/0161888 A1 | 7/2006 | Lovisa et al. |
| 2009/0006061 A1 | 1/2009 | Thukral et al. |
| 2010/0077451 A1 | 3/2010 | Fujimoto et al. |
| 2012/0116550 A1 | 5/2012 | Hoffman et al. |
| 2012/0283855 A1 | 11/2012 | Hoffman et al. |
| 2012/0290109 A1 | 11/2012 | Engelberg et al. |
| 2013/0254699 A1 | 9/2013 | Bashir et al. |
| 2016/0224650 A1* | 8/2016 | Chu .................. G06F 16/178 |
| 2019/0019095 A1* | 1/2019 | Mietke .............. G06F 16/2358 |

FOREIGN PATENT DOCUMENTS

| | | | | |
|---|---|---|---|---|
| JP | 11-120108 A | | 4/1999 | |
| JP | 2000-215244 A | | 8/2000 | |
| JP | 2002-318815 A | | 10/2002 | |
| JP | 2003-85075 A | | 3/2003 | |
| JP | 2004-532437 A | | 10/2004 | |
| JP | 2006-506757 A | | 2/2006 | |
| JP | 2007-526547 A | | 9/2007 | |
| JP | 2009-70189 A | | 4/2009 | |
| JP | 2009-181320 A | | 8/2009 | |
| JP | 2009-252189 A | | 10/2009 | |
| JP | 2010-72985 A | | 4/2010 | |
| JP | 2010-108055 A | | 5/2010 | |
| JP | 2010-113478 A | | 5/2010 | |
| JP | 2010113478 A | * | 5/2010 | ........... G06F 13/387 |
| JP | 2055141416 | * | 6/2010 | ............... G06F 9/44 |
| JP | 2010-160592 A | | 7/2010 | |
| JP | 2010160592 | * | 7/2010 | ............. G06F 17/30 |
| JP | 2010-182180 A | | 8/2010 | |
| JP | 2010-532044 A | | 9/2010 | |
| JP | 2011-53818 A | | 3/2011 | |
| JP | 2011-53843 A | | 3/2011 | |
| JP | 2012-104134 A | | 5/2012 | |
| JP | 2013-122790 A | | 6/2013 | |
| JP | 2013-543156 A | | 11/2013 | |
| JP | 2014-508335 A | | 4/2014 | |
| JP | 2015-509743 A | | 4/2015 | |
| JP | 2015-518202 A | | 6/2015 | |
| JP | 2015-520445 A | | 7/2015 | |
| WO | WO 00/079385 A1 | | 12/2000 | |
| WO | WO 2005/001656 A2 | | 1/2005 | |
| WO | WO 2008/129915 A1 | | 10/2008 | |
| WO | WO 2013/160721 A1 | | 10/2013 | |

OTHER PUBLICATIONS

Agata, T. "Easy Web System Configuration by Framework WebWork2 of Attention Degree" Web+DB Press, vol. 18, 2004, 13 Pages.

* cited by examiner

FIG. 5

```
<item key="empno" name="EMPLOYEE NUMBER" >
 <regexp>/(^\d{3,5}$)/</regexp>
</item>

<item key="ename" name="NAME" >
 <length min="" max="20" />
</item>

<item key="hiredate" name="HIRE DATE" >
 <date-value format="YYYY-MM-DD" begin="2011-10-01" end="2015-09-30" />
</item>
```

FIG. 6

VERSION 20150911-1650

RULE

| key | name | length | regexp | date-value |
|---|---|---|---|---|
| empno | EMPLOYEE NUMBER | min="" max="20" | | |
| ename | NAME | | /(^\d{3,5}$)/ | |
| hiredate | HIRE DATE | | | format="YYYY-MM-DD" begin="2011-10-01" end="2015-09-30" |

FIG. 7

```
1  [
2    version:20150911-1650
3    rules:[
4      {
5        key:empno,
6        name:EMPLOYEE NUMBER,
7        regexp:/(^¥d{3,5}$)/
8      },
9      {
10       key:ename,
11       name:NAME,
12       length:min="0" max="20"
13     },
14     {
15       key:hiredate,
16       name:HIRE DATE,
17       date-value:format="YYYY-MM-DD" begin="2011-10-01" end="2015-09-30"
18     }
19   ]
20 ]
```

```
1  {
2      empno:2084,
3      ename:Suzuki Jiro,
4      hiredate:2015-09-01
5  }
```

FIG. 13

VERSION 20150901-1809

CHECK RESULT

| key | true | false | rate |
|---|---|---|---|
| empno | 35 | 2 | 0.95 |
| ename | 32 | 3 | 0.91 |
| hiredate | 17 | 15 | 0.53 |

FIG. 14

```
1  [
2    version:20150911-1650
3    rules:[
4      {
5        key:hiredate,
6        name:HIRE DATE,
7        date-value:format= "YYYY-MM-DD" begin= "2011-10-01" end= "2015-09-30"
8      }
9    ]
10 ]
```

FIG. 15

```
1  {
2      empno:8410,
3      ename:Suzuki Saburo,
4      hiredate:2015/10/01
5  }
```

SYSTEM, CLIENT DEVICE, SERVER DEVICE, AND PROGRAM

CROSS-REFERENCE TO RELATED APPLICATIONS

This application is based upon and claims the benefit of priority from Japanese Patent Application No. 2016-173813, filed Sep. 6, 2016; the entire contents of which are incorporated herein by reference.

FIELD

Embodiments described herein relate to a system, a client device, a server device, and a program.

BACKGROUND

In an application system of a computer, input checking is performed to check whether or not a value input by a user to a field or the like on a screen is incomplete. Normally, the application system has such an input check function.

In a system of a client/server scheme, both a client device and a server device check information input by a user interface of the client device side. In a method in which only the client device or only the server device performs the check, the checking may be insufficient.

In the case of a scheme in which the checking is performed in only the client device, the user of the client side can directly issue a request to the server device by using any other means without performing an input operation on the regular screen. In this case, a request for which checking is not performed in the client device may occur. Then, there is a possibility that incorrect input information (for example, illegality of a type of data, illegality of a numeric range, or the like) is processed at the server device side.

Also, in the case of a scheme in which only the server device performs checking, there may also be a situation in which a request is transmitted from the client device side to the server device side with respect to illegal input information. This may cause a problem that the load on the communication network or the server device increases. Also, unless input checking is performed at the client device side, the operability for the user may be deteriorated.

For the above reasons, it is necessary to perform the same input information checking at both the client device side and the server device side. However, in order to perform the same type of input checking at both the client device side and the server device side, it is necessary to manage a rule for checking or a message to be displayed on the screen or the like when the result of the checking is an error at each side. Thus, it is necessary to maintain two types of check rules and two types of messages at the time of error for the client and the server, so that there is a problem in that development costs or maintenance costs of the application system significantly increase and productivity drops. Also, management of information becomes complicated, there is a possibility that changes may be omitted and inconsistencies may occur between the client and the server if a rule, a message, or the like is changed, and the serviceability of the application system deteriorates.

In the conventional technology, there is a system in which a mechanism for preventing the deterioration of the serviceability as described above has been devised.

In the conventional technology, the server device transmits a check execution function of the client device side to the client device at a timing at which the client device transmits a screen transition request to the server device. For example, such a check execution function is transmitted from the server device to the client device in source code written in JavaScript (registered trademark). According to such a conventional technology, it is also possible to centrally manage the check rules at the server device side. In this conventional technology, the client device side is assumed to have an execution environment for JavaScript (registered trademark). More specifically, in this conventional technology, the client device side is assumed to be implemented using a web browser provided with a JavaScript (registered trademark) virtual machine.

However, the above-described conventional technology also has the following problem.

First, the above-described conventional technology can be applied only when the client device side is implemented by a web browser. That is, if an application operating in smartphones, which have become widespread recently, a terminal device of the Internet of things (IoT), or the like is used at the client side, the above-described conventional technology cannot be applied.

Second, the timing at which a rule for input checking is set between the client device and the server device (synchronization is achieved by applying the latest rule) is limited to a timing at which a request for screen transition is transmitted from the client device side to the server device side. Therefore, it is not possible to change the rule for input checking at other timings. In other words, when a rule is temporarily set, the rule cannot be changed until the timing at which a screen transition request is transmitted from the client device side next time.

BRIEF DESCRIPTION OF THE DRAWINGS

FIG. 5 is a schematic diagram illustrating a configuration of an input check rule to be read by a rule read unit at the server device side according to the first embodiment.

FIG. 6 is a schematic diagram illustrating a data configuration of a rule storage unit of the server device side according to the first embodiment.

FIG. 7 is a schematic diagram illustrating an example of data (a JSON format) of a rule to be transmitted for update from the server device side to the client device side according to the first embodiment.

FIG. 13 is a schematic diagram illustrating a configuration and an example of check result data stored by a check result storage unit according to the second embodiment.

FIG. 14 is a schematic diagram illustrating an example of data of a rule transmitted from the server device side to the client device side for updating in the second embodiment.

FIG. 15 is a schematic diagram illustrating an example of data input from an input screen when there is a request in the second embodiment.

DETAILED DESCRIPTION

According to one embodiment, a system of the embodiment includes a client device and a server device.

The client device includes a first rule storage unit, a first check execution unit, a user interface control unit, a request transmission unit, and a rule update unit. The first rule storage unit stores a rule related to input checking. The first check execution unit checks input data on the basis of the rule stored in the first rule storage unit. The user interface control unit receives the input data through a user interface. The request transmission unit requests the first check execution unit to perform the input checking on the input data included in a request for performing transmission to the server device and transmits the request to the server device if a check result is success. The rule update unit requests the server device to transmit a rule for updating the first rule storage unit on the basis of a predetermined trigger and updates the first rule storage unit by using the rule transmitted from the server device as a response to the request.

The server device includes a second rule storage unit, a second check execution unit, a request reception unit, and a client rule generation unit. The second rule storage unit stores the rule related to the input checking. The second check execution unit checks the input data on the basis of the rule stored in the second rule storage unit. The request reception unit receives the request transmitted from the request transmission unit and requests the second check execution unit to perform the input checking on the input data included in the request. The client rule generation unit generates a client rule on the basis of the rule read from the second rule storage unit when a rule request is received from the rule update unit and transmits the generated rule to the client device of a request source.

Various Embodiments will be described hereinafter with reference to the accompanying drawings.

First Embodiment

Here, the first embodiment will be described.

First, a functional configuration will be described.

Figure 1:
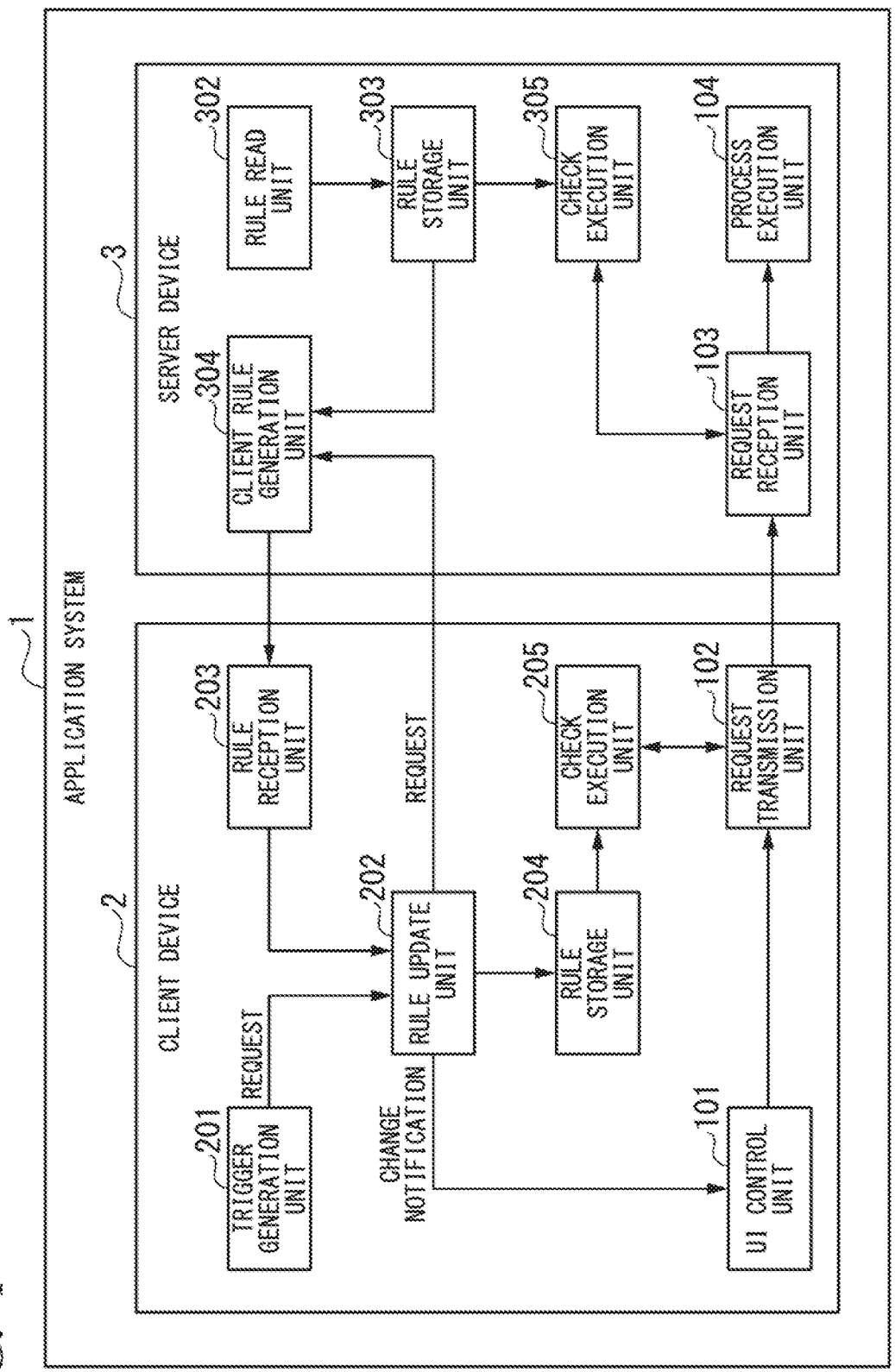
FIG. 1 is a block diagram illustrating a schematic functional configuration of an application system according to a first embodiment.

FIG. 1 is a block diagram illustrating devices constituting an application system according to the present embodiment and a schematic functional configuration of each device. In FIG. 1, only functions related to checking of input information and maintenance/update of a rule are illustrated. That is, in FIG. 1, functions specific to applications are not shown.

As illustrated, an application system 1 includes a client device 2 and a server device 3. The client device 2 is implemented using, for example, a personal computer (PC), a smartphone, a tablet terminal, a wearable terminal, or the like. The server device 3 is implemented using a server computer. The client device 2 and the server device 3 are connected through a communication line (including the Internet) and can communicate with each other.

The client device 2 is configured to include a UI control unit 101, a request transmission unit 102, a trigger generation unit 201, a rule update unit 202, a rule reception unit 203, a rule storage unit 204, and a check execution unit 205.

Also, the server device 3 is configured to include a request reception unit 103, a process execution unit 104, a rule read unit 302, a rule storage unit 303, a client rule generation unit 304, and a check execution unit 305.

The application system 1 integrally manages rules for checking the input information at the client device 2 side and the server device 3 side. The function of each unit for the management will be described below.

Functions of the units listed above are implemented using an electronic circuit. Also, the functions of the units may be implemented using a computer and a program. Also, if information is stored in each unit, a storage medium/recording medium such as a magnetic hard disk device or a semiconductor memory is used.

The functions of the units of the client device 2 side are as follows.

The UI control unit 101 has a function of controlling the user interface of the client side. The UI control unit 101 implements a function for inputting information from a screen or the like of the client device 2 as one of the user interfaces. For example, the UI control unit 101 displays a field for inputting information to the screen, and acquires information to be input to the field. In addition to fields for inputting text and numbers, the fields include an information input means such as a pull-down menu, a check box, and a radio button. That is, the UI control unit 101 has a function of receiving input data through the user interface.

The request transmission unit 102 receives the information acquired by the UI control unit 101 and transmits a request based on the information to the server device 3. Before the request is transmitted to the server device 3, the request transmission unit 102 requests the check execution unit 205 to check the input information. That is, the request transmission unit 102 requests the check execution unit 205 to perform input checking on the input data included in the request for performing transmission to the server device 3 side, and transmits the request to the server device 3 if the check result is success. If a result of the checking by the check execution unit 205 indicates that there is no error, the request transmission unit 102 transmits the above-described request. If the result of the checking by the check execution unit 205 indicates that there is an error, the request transmission unit 102 returns the process to the UI control unit so that an error message is displayed without transmitting the above-described request.

The trigger generation unit 201 generates a trigger and notifies the rule update unit 202 of the trigger. This trigger is an opportunity to update the input check rule. For example, the trigger may be generated according to any event such as application activation or input field activation on the screen. The trigger generation unit 201 can separately determine a type of event in which the trigger is generated. It is preferable that the trigger be predefined on the basis of behavior desired in the application system.

In response to a request (a trigger) from the trigger generation unit 201, the rule update unit 202 requests the server device 3 side to update the input check rule for the client device (for its own device). Specifically, the rule update unit 202 requests the client rule generation unit 304 of the server device 3 to update the rule.

Also, the rule update unit 202 acquires the rule received by the rule reception unit 203 in response to the above-described request, and updates the rule storage unit 204 with the acquired rule.

That is, the rule, update unit 202 requests the server device 3 to transmit a rule for updating the rule storage unit 204 on the basis of a predetermined trigger and updates the rule storage unit 204 by using the rule transmitted from the server device 3 as a response to the request.

The rule reception unit 203 receives the rule generated by the client rule generation unit 304 on the basis of the request from the rule update unit 202. The rule reception unit 203 transfers the received rule to the rule update unit 202.

The rule storage unit 204 stores a rule used for input checking at the client device 2 side. As described above, the rule stored in the rule storage unit 204 is updated by the rule update unit 202 at a predetermined timing. Also, the rule storage unit 204 is implemented using a storage means such as a magnetic hard disk device or a semiconductor memory.

By referring to the rule stored in the rule storage unit 204, the check execution unit 205 checks the input information on the basis of the rule. As described above, the check execution unit 205 checks the input information on the basis of the request from the request transmission unit 102. As a result of executing the check, the check execution unit 205 returns information indicating whether or not there is an error to the request transmission unit 102. In other words, the check execution unit 205 determines whether or not to transmit the request transferred from the request transmission unit 102 to the server device 3 side.

The functions of the units on the server device 3 side are as follows.

The request reception unit 103 receives the request transmitted from the request transmission unit 102 of the client device 2 side. Then, the request reception unit 303 requests the check execution unit 305 to check information included in the received request (information input at the client device 2 side). In other words, the request reception unit 103 receives the request transmitted from the client device 2 side and requests the check execution unit 305 to perform the input checking on the input data included in the request. If a check result of the check execution unit 305 indicates that an error has not been found, the request reception unit 103 requests the process execution unit 104 to process the request. If the check result of the check execution unit 305 indicates that an error has been found, the request reception unit 103 transfers control to an exception process for an error time.

The process execution unit 104 executes a process according to details of the request transferred from the request reception unit 103. The details of the specific process executed by the process execution unit 104 depend on details of a task covered by the application system 1.

The rule read unit 302 reads an externally transferred input check rule and updates the rule stored in the rule storage unit 303 on the basis of information about the read rule. Also, the rule transferred to the rule read unit 302 is a rule described in a predetermined format.

The rule storage unit 303 stores input check rules at the server device 3 side. The rule stored by the rule storage unit 303 is referred to for checking by the server side check execution unit 305 and is referred to by the client rule generation unit 304 to generate a rule to be transferred to the client device 2 side. The rule storage unit 303 is implemented using a storage means such as a magnetic hard disk device or a semiconductor memory.

In response to the request from the client device 2 side, the client rule generation unit 304 reads an input check rule from the rule storage unit 303, creates an input check rule of the client side, and transmits the input check rule to the client device 2 side.

The check execution unit 305 reads the rule stored in the rule storage unit 303 and checks the input information included in the request requested from the request reception unit 103 on the basis of the rule. If a check result indicates that an error is included, the check execution unit 305 transmits a response to the request reception unit 103 so that the request is not processed. If the check result indicates that no error is included, the check execution unit 305 transmits a response to the request reception unit 103 so that the request process continues to be executed.

As described above, in the functional configuration illustrated in FIG. 1, it is possible to perform the input information check at the client device 2 side and the input information check at the server device 3 side on the basis of the same rule. Rules are by nature managed in a centralized manner at the server device 3 side. Also, the rule update unit 202 of the client device side requests the client rule generation unit 304 of the server device 3 side to update a rule on the basis of a predetermined trigger. When this request is made, the client rule generation unit 304 generates a rule for the client device 2 on the basis of information about the rule stored in the rule storage unit 303 at that time and transmits a reply to the client device 2 side.

When the generated rule is received, the rule update unit 202 of the client device 2 side updates the rule storage unit 204 storing the rule. That is, the updating is not limited to a timing of screen transition and it is possible to update the rule of the client device 2 side at a timing of any trigger. Even when there are a plurality of client devices 2, they function similarly. Also, even when there are a plurality of types of client devices 2 (for example, a personal computer and a smartphone), each client device 2 can perform the input checking using the latest rule transmitted from the server device 3.

Next, the main process in the application system 1 will be described in order.

Figure 2:
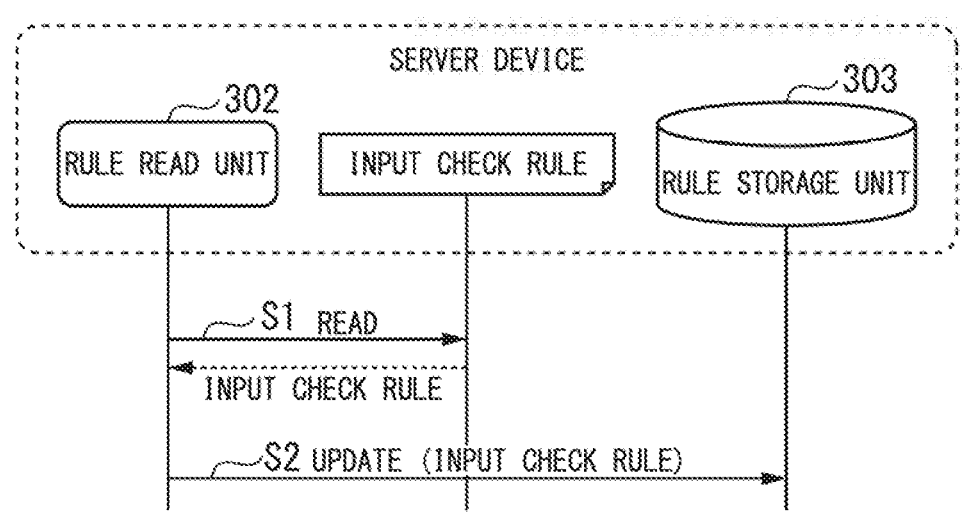
FIG. 2 is a sequence chart illustrating a procedure of a process of updating an input check rule at a server device side according to the first embodiment.

FIG. 2 is a sequence chart illustrating a procedure of a process of updating an input check rule at the server device side. The process of updating the rule at the server device side is executed, for example, when the application system is activated or when the application system is reactivated. However, the rule may be updated at the server device side while the application system is operating or while the application system is stopped.

First, in step S1, the rule read unit 302 reads the input check rule. Also, for example, the input check rule is given as a text file.

Next, in step S2, the rule read unit 302 updates the rule stored in the rule storage unit 303 by using the read input check rule.

Figure 3:
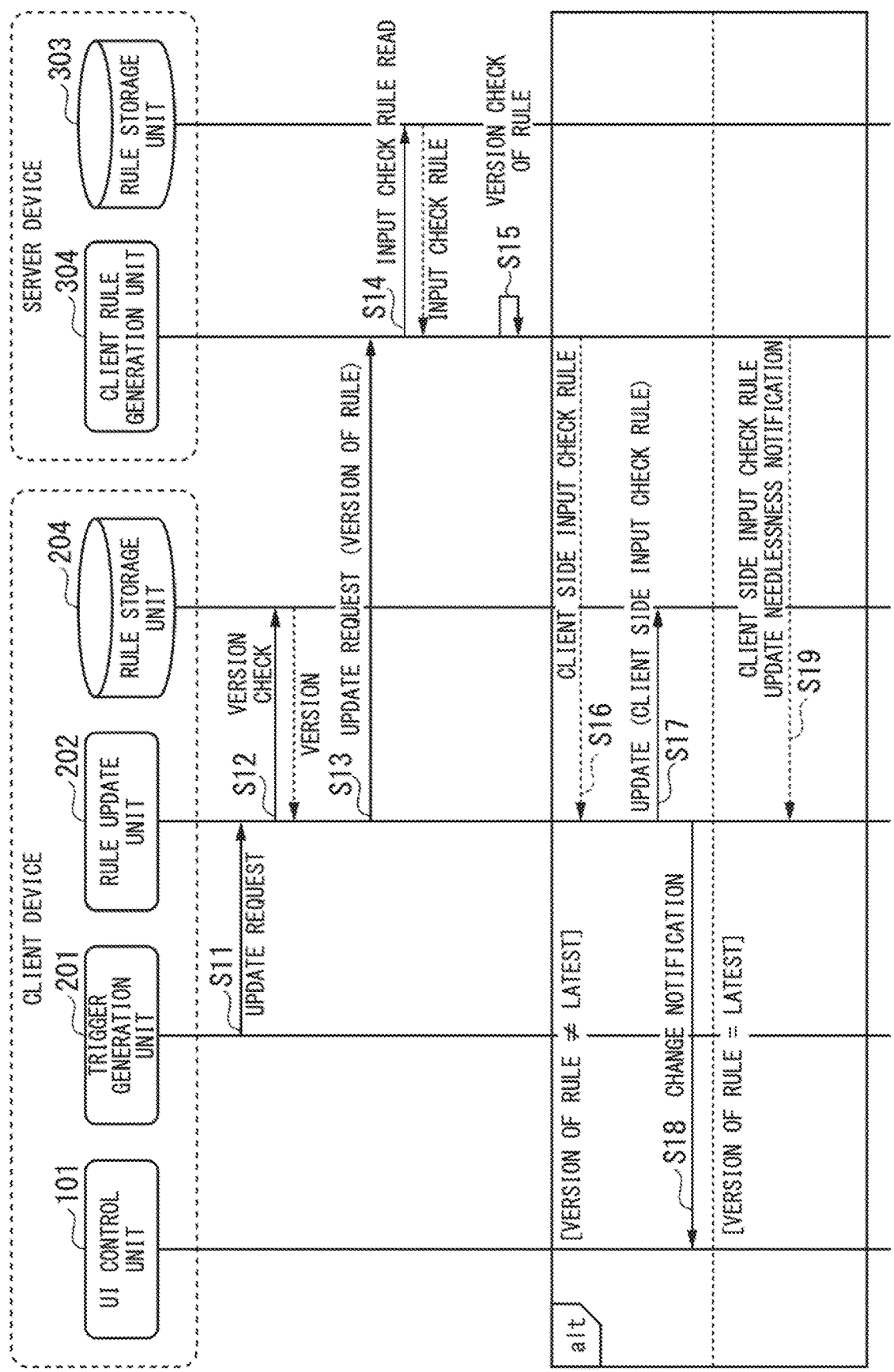
FIG. 3 is a sequence chart illustrating a procedure of a process of updating an input check rule at a client device side according to the first embodiment.

FIG. 3 is a sequence chart illustrating a procedure of a process of updating an input check rule at the client device side. Rule update at this client device side is executed with any trigger as a starting point. An example of the trigger is activation of an application program at the client side, screen transition on an input screen, or the like. The procedure will be described below according to this chart.

First, in step S11, the trigger generation unit 201 requests update of a rule.

Next, in step S12, the rule update unit 202 checks a version of the rule stored in the rule storage unit 204 at that time. Specifically, the rule update unit 202 reads current version information from the rule storage unit 204. The version information is, for example, information about a date and time character string.

Next, in step S13, the rule update unit 202 transmits a rule update request to the client rule generation unit 304 of the server device side. At this time, the rule update unit 202 adds the version information about the current rule acquired in step S12 to the update request, and transmits the update request.

Next, in step S14, the client rule generation unit 304 that has received the update request reads the input check rule from the rule storage unit 303.

Next, in step S15, the client rule generation unit 304 checks the version information about the rule. That is, the client rule generation unit 304 compares the version information received from the client device side (the version of the rule held by the client device at that time) with the version information held on the server device side. Here, the process branches on the basis of a comparison result. In FIG. 3, in a part indicated by "alt," any one is executed on the basis of the comparison result.

If the version of the rule of the client device side is not the latest, that is, if the version of the rule of the client device side is older than the version of the rule held at the server device side, the process proceeds to the next step S16.

If the version of the rule of the client device side is the latest, that is, if the version of the rule of the client device side is the same as the version of the rule held at the server device side, the process jumps to step S19.

When the process proceeds to step S16, the client rule generation unit 304 generates a rule for the client device and transmits the rule to the client device 2 side in the same step. The client rule generation unit 304 transmits a rule with a JavaScript Object Notation (JSON) format to the client device 2 side. The JSON format is a format suitable for exchanging data between various platforms and various programming languages. By using the rules with a JSON format, the process can be performed at the client device side regardless of a type of client device. Also, at this time, the client rule generation unit 304 attaches the version information about the rule to the rule to be transmitted and transmits the rule to the client device 2 side. At the client device 2 side, the rule reception unit 203 receives the rule and transfers the received rule to the rule update unit 202.

Next, in step S17, the rule update unit 202 updates the rule storage unit 204 by using the received rule. According to this update, the old rule stored in the rule storage unit 204 is deleted. When the rules in the rule storage unit 204 are updated, the rule update unit 202 also updates the version information.

Next, in step S18, the rule update unit 202 transfers a change notification indicating that the rule has been changed to the UI control unit 101.

When the process proceeds from step S15 to S16, the process of updating the rules at the client device side is completed.

When the process proceeds from step S15 to step S19, the client rule generation unit 304 transmits the notification indicating that it is unnecessary to update the rule at the client device side to the client device 2 in step S19. This notification is called a client side input check rule change needlessness notification. The reason why the updating of the rule is unnecessary is that the rule held at the client device 2 side is the latest version.

If the process proceeds from step S15 to S19, the process of updating the rule at the client device side is completed.

Figure 4:
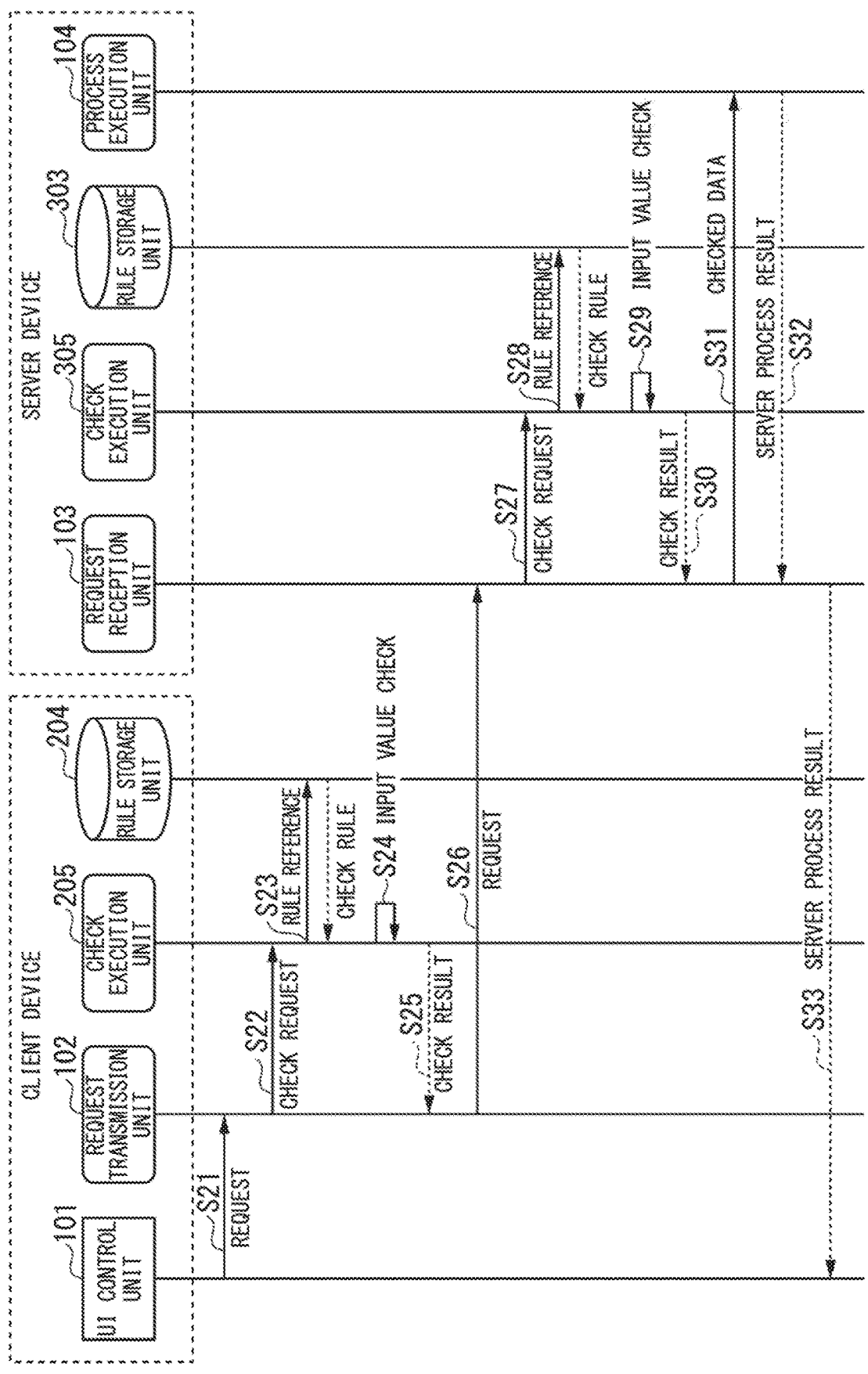
FIG. 4 is a sequence chart illustrating a procedure of an input check process according to transmission of a request from the client device side to the server device side according to the first embodiment.

FIG. 4 is a sequence chart illustrating a procedure of an input check process according to transmission of a request from the client device side to the server device side. An input value at the client device 2 side is checked according to the user's action such as pressing of a request transmission button or movement of a focus between the input fields. The input value at the server device 3 side is checked at a timing at which the request is received from the client side. Hereinafter, a procedure in a series of processes in which the client device 2 presses the request transmission button and the client device 2 transmits a request will be described.

First, in step S21, the UI control unit 101 acquires data input by the user from a screen or the like, and transfers a request including the input data to the request transmission unit 102.

Next, in step S22, the request transmission unit 102 transfers the input data to the check execution unit 205 and requests the checking of the input data.

Next, in step S23, the check execution unit 205 refers to an input check rule stored in the rule storage unit 204.

Next, in step S24, the check execution unit 205 checks the input data transferred from the request transmission unit 102 on the basis of the rule read from the rule storage unit 204. Then, the check execution unit 205 determines the presence or absence of an error with respect to the input data.

Next, in step S25, the check execution unit 205 returns a check result to the request transmission unit 102. On the basis of the check result, the request transmission unit 102 determines whether or not to transmit the request to the server device 3 side. If the check result indicates that there is no error (in the case of input check success), the request transmission unit 102 transmits the request to the server device 3 side. The case in which the input check result indicates that there is no error is illustrated in FIG. 4.

Also, if the check result indicates that there is an error (in the case of input check failure), the request transmission unit 102 suspends the subsequent processing. That is, in the case of an error, the request transmission unit 102 does not transmit a request to the server device 3 side.

Next, in step S26, the request transmission unit 102 transmits a request for which the input checking is completed at the client device 2 side to the server device 3.

Next, in step S27, the request reception unit 103 that has received the request from the client device 2 side transfers the input data included in the request to the check execution unit 305 and requests the check execution unit 305 to check the input data.

Next, in step S28, the check execution-unit 305 refers to the input check rule stored in the rule storage unit 303.

Next, in step S29, the check execution unit 305 checks a value of the input data transferred from the request reception unit 103 on the basis of the rule read from the rule storage unit 303. Then, the check execution unit 305 determines the presence or absence of an error with respect to the input data.

Next, in step S30, the check execution unit 305 returns a check result to the request reception unit 103. The request reception unit 103 determines whether or not to transfer the request to the process execution unit 104 on the basis of the check result. If the check result indicates that there is no error (in the case of input check success), the request reception unit 103 transfers the request to the process execution unit 104. The case in which the input value check result indicates that there is no error is illustrated in FIG. 4.

Also, if the check result indicates that there is an error (in the case of input check failure), the request reception unit 103 suspends the subsequent processing. That is, in the case of an error, the request reception unit 103 does not transfer the request to the process execution unit 104.

If there is no problem in the check result, the request reception unit 103 transfers the request including the checked input data to the process execution unit 104 in the next step S31. In response thereto, the process execution unit 104 performs a process using the input data. More, details of the process to be performed by the process execution unit 104 are arbitrary and the application system executes a specific process.

Next, in step S32, the process execution unit 104 returns a process result (a server process result) to the request reception unit 103.

Next, in step S33, the request reception unit 103 returns the server process result received from the process execution unit 104 to the UI control unit 101 of the client device 2 side. The UI control unit 101 performs screen display on the basis of the received server process result.

The main processing procedure has been described above. Next, the configuration of the data used in each process will be described.

FIG. 5 is a schematic diagram illustrating a configuration of an input check rule read by the rule read unit at the server device side. As illustrated, the input check rule is data described in an extensible markup language (XML) format. As described in step S1 of FIG. 2, the rule read unit 302 reads data of this input check data supplied as a file or the like.

Here, rules for three data items are shown as an example. Each of these items corresponds to a field of the input screen displayed by the UI control unit 101. Each data item corresponds to an item element. As an attribute of the item element, a key attribute indicates an identification name of the data item, and a name attribute indicates a name of the data item. Also, a check rule is expressed using, for example, a regexp element, a length element, a date-value element, and the like.

The regexp element is used to describe a rule expressed by a regular expression. When the input data matches the regular expression described in the rule, the input data is determined to be correct. If the input data does not match the regular expression, the input data is determined to be an error.

The length element is used to describe a rule related to a length of a string type of data. A min attribute indicates a minimum length. A max attribute indicates a maximum length. When the length of the input data is greater than or equal to the minimum value described in the rule and less than or equal to the maximum value, the input data is determined to be correct. If the length of the input data is other values, the input data is determined to be an error.

The date-value element is used to describe a rule related to a format and range of date type data. The format attribute indicates a rule related to a description format of the date. For example, if a value of the format is identified as "YYYY-MM-DD," it is determined that the date data described in the format is correct, and other date data is determined to be an error. Here, YYYY is a year indicated by four digits, MM is a month indicated by two digits, and DD is a day indicated by two digits. Also, a begin attribute and an end attribute indicate a value range (a period) of the date. The begin attribute indicates a first day of the period. The end attribute indicates a last day of the period. If the input data is within the range of this period, it is determined that the date data is correct. When the date of the input data is outside of the range of the period, the input data is determined to be an error.

In the example illustrated in FIG. 5, the first rule is a rule related to a data item empno (a data item name is "employee number"). Then, the input data is intended to be checked according to the regular expression "/(○¥d{3,5}$)/". Also, this regular expression matches a numeric value of 3 digits or more and 5 digits or less.

The second rule is a rule related to a data item ename (a data item name is "name"). With respect to the length of the character string, no lower limit is provided (min="") and an upper limit is set to 20.

Also, the third rule is a rule related to a data item hiredate (a data item name is "hire date"). Then, it is checked that a written format of the date data is "YYYY-MM-DD". Also, it is checked that the date data is within a period from "2011-10-01" to "2015-09-30."

FIG. 6 is a schematic diagram illustrating a data configuration of the rule storage unit of the server device side. As illustrated, the rule storage unit 303 stores version information and rules. The version information in the present embodiment is a date and time character string. Version information "20150911-1650" in the illustrated example indicates that the rule is of a version at 16:50 on Sep. 11, 2015. Also, it is not necessary to express the version information as information about the date and time as long as the version of the rule can be identified from the version information. The rule in the rule storage unit 303 is indicated by a two-dimensional table structure. This table has five items such as key, name, length, regexp, and date-value. Also, each row of the table corresponds to a data item. The data example of the rule storage unit 303 illustrated in FIG. 6 corresponds to an input data check rule illustrated in FIG. 5.

The configuration of the data held by the rule storage unit 204 at the client device 2 side is similar to that of the rule storage unit 303 at the server device 3 side. That is, the rule storage unit 204 at the client device 2 side stores data similar to the configuration illustrated in FIG. 6. Therefore, detailed description thereof will be omitted here.

FIG. 7 is a schematic diagram illustrating an example of data of a rule transmitted from the server device side to the client device side for updating. That is, the illustrated data is data transmitted from the client rule generation unit 304 of the server device 3 side to the client device 2 in step S16 in FIG. 3. As described above, the client rule generation unit 304 of the server device 3 side transmits data described in the JSON format. However, when a rule for updating is transmitted, it is not always necessary to use the JSON format, and it is also possible to transmit data in other formats. In FIG. 7, row numbers are given for the sake of convenience.

As illustrated, this data includes version information and a rule. "20150911-1650" subsequent to "version:" of a $2^{nd}$ row is version information. Then, a part subsequent to "rules:" of a $3^{rd}$ row is a rule. The rule is described in a part surrounded by a left angle brace of the $3^{rd}$ row and a right angle brace of a $19^{th}$ row. This description contains three rules.

The first rule is described in a part surrounded by a left curly brace of a $4^{th}$ row and a right curly brace of an $8^{th}$ row. This rule is related to the data item empno (an employee number), and a matching regular expression is defined.

The second rule is described in a part surrounded by the left curly brace in a $9^{th}$ row and the right curly brace in a $13^{th}$ row. This rule is related to the data item ename (a name), and a minimum value and a maximum value of the length of the string (a character string) are defined.

The third rule is described in a part surrounded by the left curly brace of a $14^{th}$ row and the right curly brace of an $18^{th}$ row. This rule is related to the data item hiredate (a hire date), and the expression format of the date and the range of the date (a start date and an end date of a period) are defined.

These three rules correspond to the rule illustrated in FIG. 5 and the rule illustrated in FIG. 6.

Figures 8, 9:
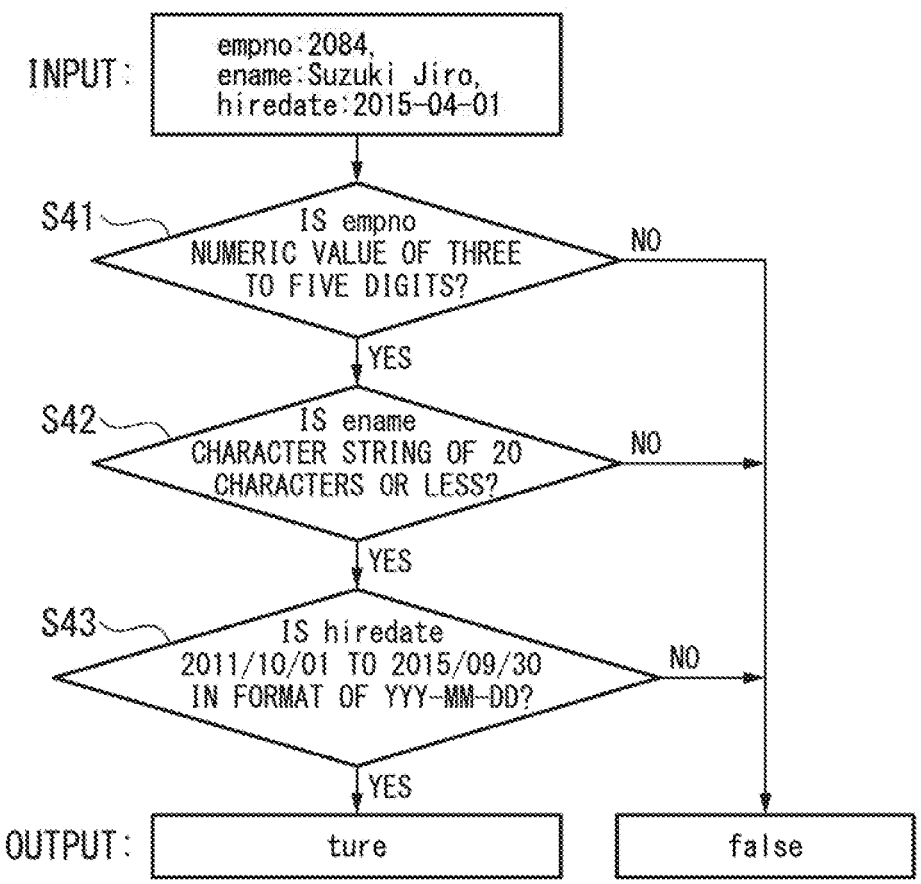
FIG. 8 is a schematic diagram illustrating a data example for a request to be transmitted from the client device side to the server device side according to the first embodiment.
FIG. 9 is a decision chart illustrating branching of a determination by a check execution unit at the client device side and the server device side according to the first embodiment.

FIG. 8 is a schematic diagram illustrating an example of data of a request created by the UI control unit of the client device side and transmitted to the server device side. As illustrated, the data of this request is also data described in the JSON format. However, it is not always necessary to describe the data in the JSON format, and other formats may be defined to be used. In FIG. 8, a row number is attached to each row of data for the sake of convenience.

The illustrated example of the data corresponds to three input fields on the user interface screen. Data in the $2^{nd}$ row holds "2084" as the value of the data item empno (the employee number). Data in the $3^{rd}$ row holds "Suzuki Jiro" as a value of the data item ename (the name). Data in the $4^{th}$ row holds "2015-09-01" as a value of the data item hiredate (the hire date).

A case in which the check execution unit 205 and the check execution unit 305 perform an input value check process on data of this request is considered. The rules used for the check process are as illustrated in FIG. 6 and the like. The result of the check process is as follows. That is, the data input in the first empno (employee number) is "2084." If this data is checked with the rule related to empno, the check succeeds because the data matches a pattern of a "numeric value of 3 digits or more and 5 digits or less." Also, the data input in the second ename (name) is "Suzuki Jiro." When this data is checked with the rule related to ename, the check succeeds because the condition that the length of the character string is 0 or more and 20 or less is satisfied. Also, the data input in the third hiredate (hire date) is "2015-09-01." When this data is checked with the rule related to hiredate, the format will match "YYYY-MM-DD" and the check succeeds because the condition that this date is included in a period beginning on 2011-10-01 and ending on 2015-09-30 is satisfied.

That is, it is confirmed that a check result related to the input value included in this request indicates that there is no error.

FIG. 9 is a decision chart illustrating a branch of a determination when the check execution unit 205 or the check execution unit 305 performs a check process on the basis of previously exemplified rules. FIG. 9 illustrates a relationship between an input and an output of the check process. Also, in FIG. 9, the request illustrated also in FIG. 8 is shown as an example of input. A procedure of the determination illustrated in FIG. 9 is as follows.

Step S41 corresponds to a rule related to data of empno. In step S41, it is determined whether or not the given data empno is a numeric value of three digits or more and five digits or less. If empno is a numeric value of 3 digits or more and 5 digits or less (step S41: YES), the process proceeds to the next step S42. If empno does not satisfy a condition thereof (step S41: NO) it is determined that the output is "false" (check failure), and the entire check process is terminated.

Step S42 corresponds to the rule related to the data of ename. In step S42, it is determined whether or not the given data ename is a character string of length 20 or less. When ename is a character string of length 20 or less (step S42: YES), the process proceeds to the next step S43. If ename does not satisfy a condition thereof (step S42: NO), it is determined that the output is "false" (check failure), and the entire check process is terminated.

Step S43 corresponds to a rule related to data of hiredate. In step S43, it is determined whether or not the given data hiredate is in the format of YYYY-MM-DD and is within a range from 2011-10-01 to 2015-09-30. When hiredate is in the format of YYYY-MM-DD and is within the range from 2011-10-01 to 2015-09-30 (step S43: YES), the output is determined to be "true" (check success) and the entire check process is terminated. When hiredate does not satisfy a condition thereof (step S43: NO), it is determined that the output is "false" (check failure) and the entire check process is terminated.

According to the above-described procedure, the check execution unit 205 and the check execution unit 305 determine "true" or "false" as an output value for the given input data.

According to the present embodiment, it is possible to centrally integrate and manage input check rules at the server device 3 side. Also, it becomes possible to update the rule stored at the client device 2 side at any timing by appropriately setting the generation of a trigger.

Second Embodiment

Next, the second embodiment will be described. Also, matters specific to the present embodiment will be described here, and description of matters already described in the above-described embodiment will be omitted.

Figure 10:
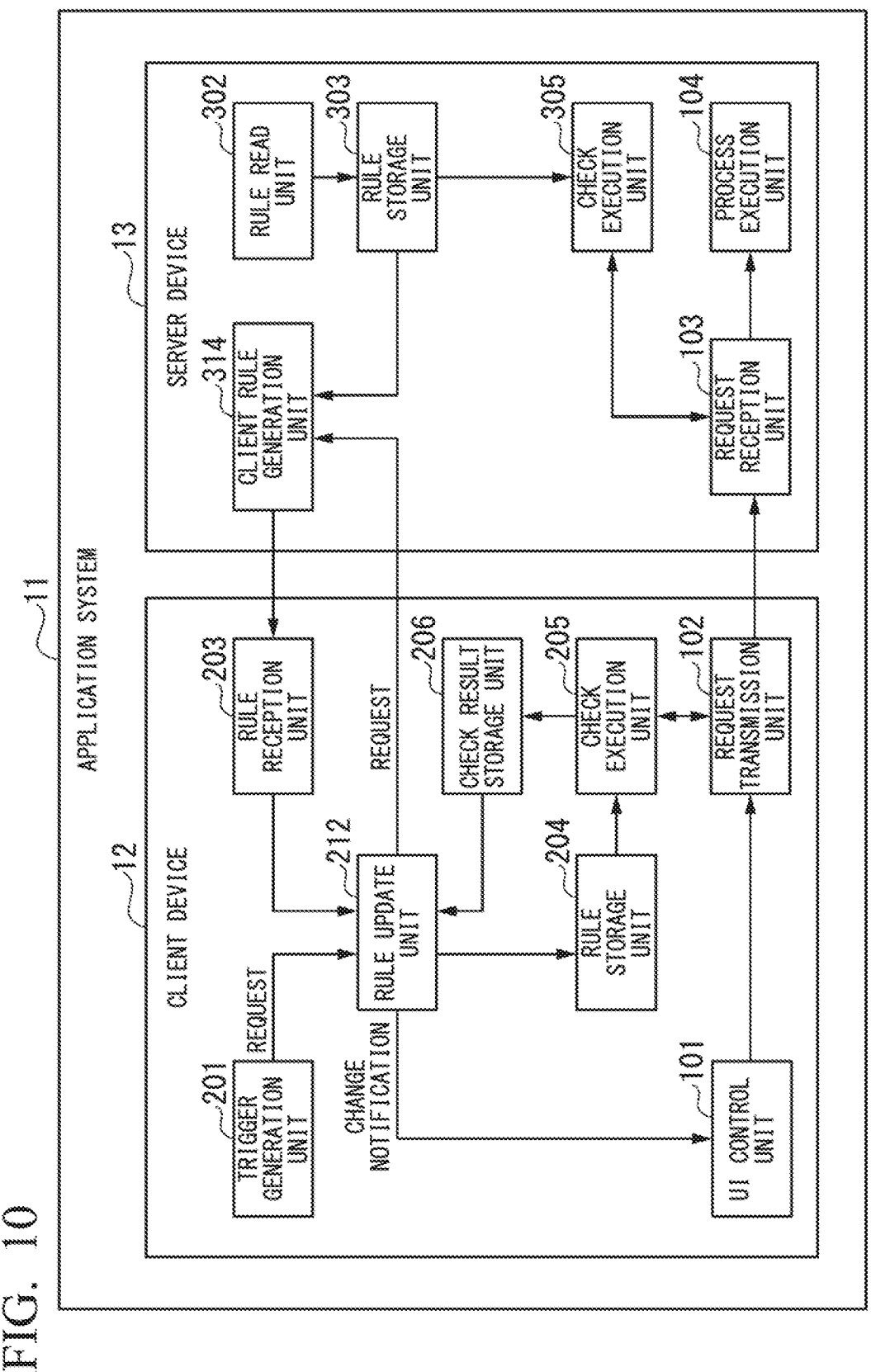
FIG. 10 is a block diagram illustrating a schematic functional configuration of an application system according to a second embodiment.

FIG. 10 is a block diagram illustrating a schematic functional configuration of an application system according to the present embodiment. As illustrated, the application system 11 includes a client device 12 and a server device 13. As in the first embodiment, the client device 12 and the server device 13 can communicate with each other via a communication line or the like.

The client device 12 in the present embodiment is implemented using, for example, Raspberry Pi (IoT terminal). However, the client device 12 may be implemented by another device.

The client device 12 includes a UI control unit 101, a request transmission unit 102, a trigger generation unit 201, a rule update unit 212, a rule reception unit 203, a rule storage unit 204, a check execution unit 205, and a check result storage unit 206. The client device 12 is characterized in that the check result storage unit 206 which is not included in the first embodiment is provided and the rule update unit 212 is provided instead of the rule update unit 202 in the first embodiment.

Also, the server device 13 is configured to include a request reception unit 103, a process execution unit 104, a rule read unit 302, a rule storage unit 303, a client rule generation unit 314, and a check execution unit 305. The server device 13 is characterized in that the client rule generation unit 314 is provided instead of the client rule generation unit 304 in the first embodiment.

Here, functions specific to the present embodiment will be described.

The check result storage unit 206 stores data of a check execution result from the check execution unit 205. Specifically, the check result storage unit 206 stores statistical information indicating whether the check result is success or failure. More specifically, for each of the data items on which input checking is performed, the check result storage unit 206 stores the number of success checks, the number of failed checks, and a success rate (a ratio obtained by dividing the number of success checks by the total number of check attempts).

Similar to the rule update unit 202 in the first embodiment, the rule update unit 212 requests the server device 13 side to update a rule. Then, the rule update unit 212 updates the rule storage unit 204 with a rule transmitted from the server device 13 side. A function unique to the present embodiment in the rule update unit 212 is a function of transmitting statistical information about the check results stored in the check result storage unit 206 when the server device 13 side is requested to update a rule.

Similar to the client rule generation unit 304 in the first embodiment, the client rule generation unit 314 transmits the rule read from the rule storage unit 303 as JSON format data to the client device 12 side. A function unique to the present embodiment in the client rule generation unit 314 is that a rule is selected and only the selected rule is transmitted on the basis of the statistical information about the check results when a rule for a client is generated. Specifically, for example, the client rule generation unit 314 selects only a rule in relation to a data item whose check success rate is less than a predetermined threshold value and transmits only the selected rule to the client device 12 side.

As described above, the present embodiment is characterized in that check result information is accumulated as the statistical information and the rules to be transmitted from the server device 13 side to the client device 12 side are narrowed down on the basis of the check result information.

Next, the processing procedure in the present embodiment will be described.

Because the process of updating the rule for checking the input at the server device 13 side is the same as that in the first embodiment, description thereof will be omitted here.

Figure 11:
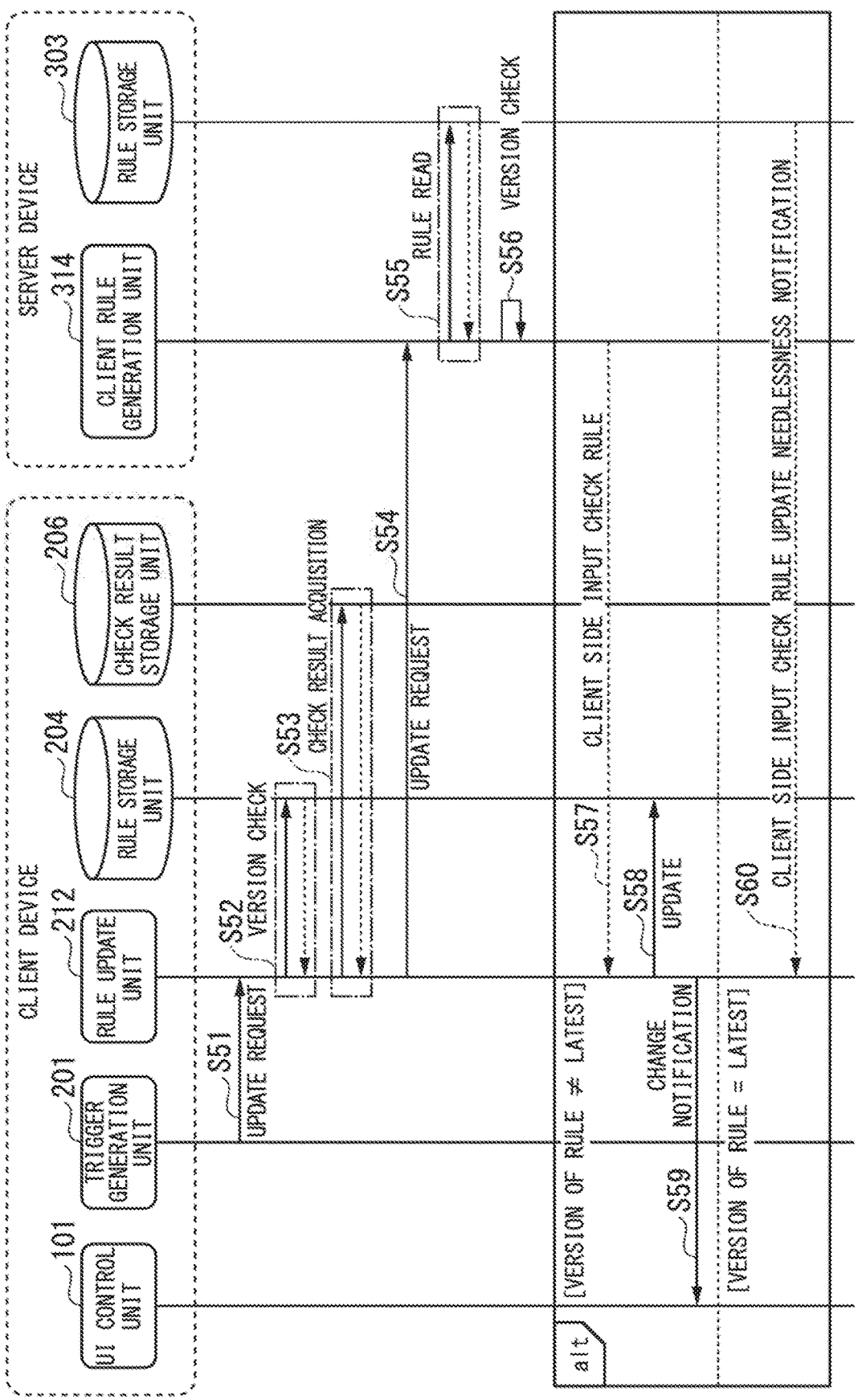
FIG. 11 is a sequence chart illustrating a procedure of a process of updating an input check rule at a client device side according to the second embodiment.

FIG. 11 is a sequence chart illustrating a procedure of a process of updating an input check rule at the client device side. The updating of the rule at this client device side is executed with any trigger as a starting point. The procedure will be described below according to this chart.

First, in step S51, the trigger generation unit 201 requests the updating of the rule. In the present embodiment, the service activation of Raspberry Pi is triggered as an example.

Next, in step S52, the rule update unit 212 confirms the version of the rule stored at that time in the rule storage unit 204. This processing is similar to the processing of step S12 of FIG. 3.

Next, in step S53, the rule update unit 212 reads the check result information from the check result storage unit 206. Also, the check result information acquired here is statistical information about previous check results in the client device. A specific example of the check result information will be described below.

Next, in step S54, the rule update unit 212 transmits a rule update request to the client rule generation unit 314 of the server device side. At this time, the rule update unit 212 transmits version information about the current rule acquired in step S52 and the check result information acquired in step S53 along with the update request.

Next, in step S55, the client rule generation unit 314 reads an input check rule from the rule storage unit 303. This processing is similar to the processing of step S14 of FIG. 3.

Next, in step S56, the client rule generation unit 314 checks the version information about the rule. This processing is similar to the processing of step S15 of FIG. 3. Then, the process branches according to the version information.

In FIG. 11, in a part indicated by "alt," any one is executed on the basis of the version information.

If the version of the rule of the client device side is not the latest version, the process proceeds to the next step S57.

If the version of the rule of the client device side is the latest, the process jumps to step S60.

When the process proceeds to step S57, the client rule generation unit 314 generates a rule for the client device 12 of the request source and transmits the generated rule to the client device 12 side in the same step.

Also, the client rule generation unit 314 selects a rule on the basis of the check result information received from the client device 12 side and transmits only the selected rule to the client device 12 side. Specifically, the client rule generation unit 314 refers to the received check result information and selects only a rule for which a success rate in past check processes is less than the predetermined threshold value. More specifically, the client rule generation unit 314 selects only a rule related to a key for which a success rate in past check processes is less than the predetermined threshold value among the rules read from the rule storage unit 303. Here, for example, 0.6 is used as the threshold value of the success rate. Alternatively, as the threshold value of the success rate, for example, any value within the range of 0.5 or more and 0.7 or less may be used.

Also, the client rule generation unit 314 attaches the version information about the rule to the rule to be transmitted and transmits the rule to the client device 12 side.

At the client device 12 side, the rule reception unit 203 receives the rule and transfers the received rule to the rule update unit 212.

Next, in step S58, the rule update unit 202 updates the rule storage unit 204 by using the received rule. This processing is similar to the processing of step S17 of FIG. 3.

Next, in step S59, the rule update unit 212 transfers a change notification indicating that the rule is changed to the UI control unit 101.

If the process proceeds from step S56 to S57, the rule update process at the client device side is completed.

When the process proceeds from step S56 to step S60, the client rule generation unit 314 transmits a rule update needlessness notification to the client device 12 at the client device side in step S56. This processing is similar to the processing of step S19 of FIG. 3.

When the process proceeds from step S56 to step S60, the rule update process at the client device side is completed.

Figure 12:
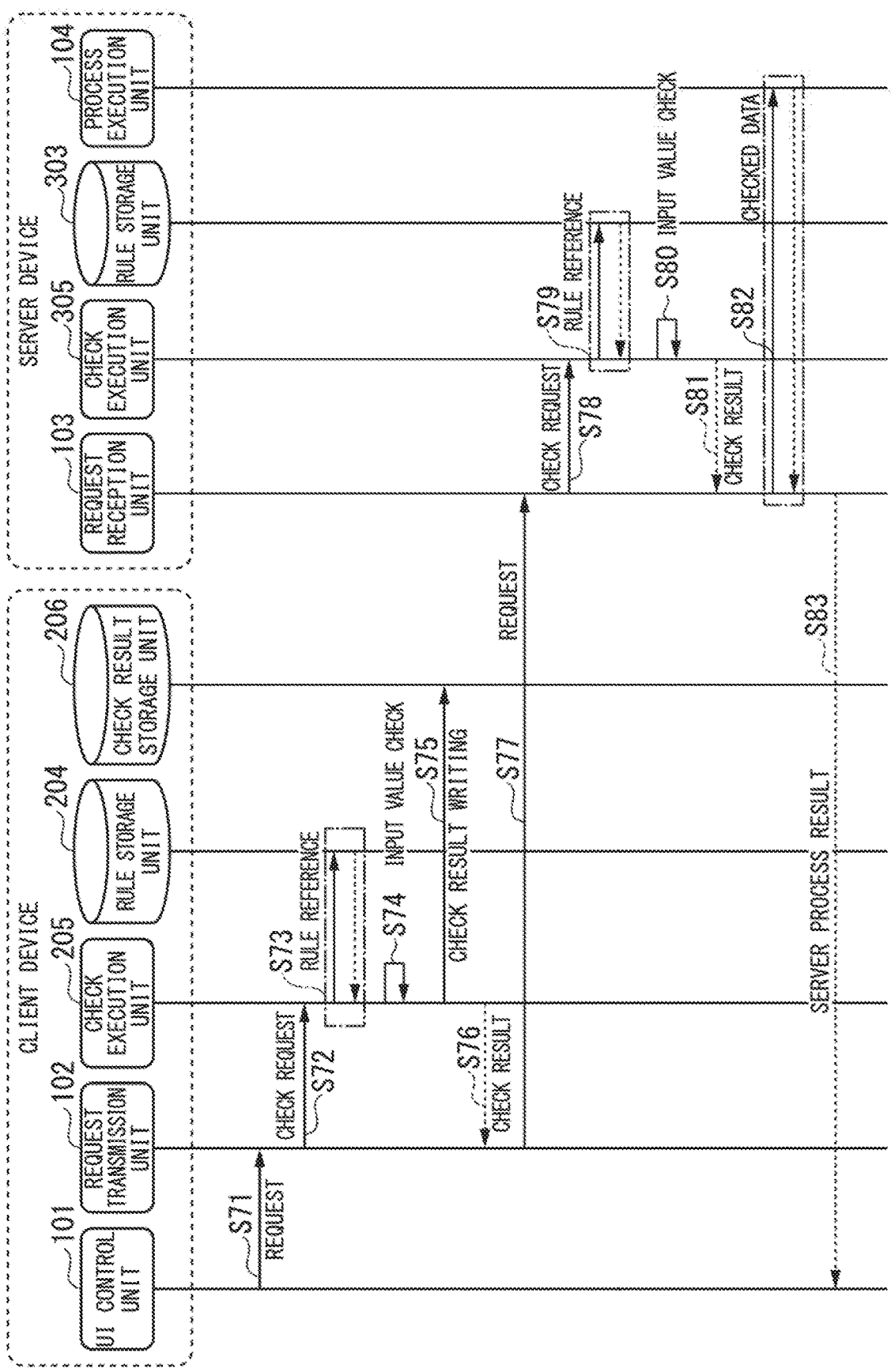
FIG. 12 is a sequence chart illustrating a procedure of an input check process according to request transmission from the client device side to the server device side according to the second embodiment.

FIG. 12 is a sequence chart illustrating a procedure of the input check process according to request transmission from the client device side to the server device side. Hereinafter, a procedure in a series of processes in which a request transmission button is pressed in the client device 12 and the client device 12 transmits a request will be described.

First, in step S71, a request including input data is transferred to the request transmission unit 102. This processing is similar to the processing of step S21 of FIG. 4.

Next, in step S72, the request transmission unit 102 requests the check execution unit 205 to check m input data. This processing is similar to the processing of step S22 of FIG. 4.

Next, in step S73, the check execution unit 205 refers to the rule stored in the rule storage unit 204. This processing is similar to the processing of step S23 of FIG. 4.

Next, in step S74, the check execution unit 205 checks the input data transferred from the request transmission unit 102 on the basis of the rule read from the rule storage unit 204. This processing is similar to the processing of step S24 of FIG. 4.

Next, in step S75, the check execution unit 205 writes a result of the check executed in step S74 to the check result storage unit 206. Specifically, the check execution unit 205 updates statistical information indicating whether the check result is true (check success) or false (check failure) for each checked data item.

Also, a specific example of the check result data and updating of the statistical information will be described below with reference to FIG. 13.

Next, in step S76, the check execution unit 205 returns the check result to the request transmission unit 102. Then, the request transmission unit 102 determines whether or not to transmit the request to the server device 13 side on the basis of the check result. The request transmission unit 102 transmits the request to the server device 13 side only if the check succeeds. If the check fails, the client device 12 observes the subsequent processing closely. This processing is similar to the processing of step S25 of FIG. 4.

Next, in step S77, the request transmission unit 102 transmits a request for which input checking is completed to the server device 13. This processing is similar to the processing of step S26 of FIG. 4.

Next, in step S78, the request reception unit 103 requests the check execution unit 305 to check input data included in the received request. This processing is similar to the processing of step S27 of FIG. 4.

Next, in step S79, the check execution unit 305 refers to the rule stored in the rule storage unit 303. This processing is similar to the processing of step S28 of FIG. 4.

Next, in step S80, the check execution unit 305 checks a value of the input data transferred from the request reception unit 103. This processing is similar to the processing of step S29 of FIG. 4.

Next, in step S81, the check execution unit 305 returns the check result to the request reception unit 103. On the basis of the check result, the request reception unit 103 determines whether or not to transfer the request to the process execution unit 104. This processing is similar to the processing of step S30 of FIG. 4.

If there is no problem in the check result, the request reception unit 103 transfers the request including the checked input data to the process execution unit 104 in the next step S82. The process execution unit 104 performs a process using input data. Then, the process execution unit 104 returns a process result (a server process result) to the request reception unit 103. This processing is similar to the processing of steps S31 and S32 of FIG. 4.

Next, in step S83, the request reception unit 103 returns the server process result received from the process execution unit 104 to the client device 12 side. This processing is similar to the processing of step S33 of FIG. 4.

Next, a configuration of data used in each process of the present embodiment will be described.

FIG. 13 is a schematic diagram illustrating a configuration and an example of the check result data stored by the check result storage unit. As illustrated, the check result storage unit 206 has version information and statistical information about check results. The version information is information indicating a version of a rule. In the present embodiment, the version information includes a date and time character string. The statistical information about the check results includes a count value of true (check success), a count value of false (check failure), and a value of a rate (a success rate) for each data item (key).

In the illustrated example, the version information is "20150901-1809."

Also, for the data item empno, the value of true is 35, the value of false is 2, and the rate is 0.95 (35/(35+2)). For the data item ename, the value of true is 32, the value of false is 3, and the rate is 0.91 (32/(32+3)). For the data item hiredate, the value of true is 17, the value of false is 15, and the rate is 0.53 (17/(17+15)). Here, the rate is rounded off to the third decimal place.

The check execution unit 205 updates the check result storage unit 206 every time the check process is executed. More specifically, the check execution unit 205 increments the count of true or false in the check results for each data item (key). Also, the check execution unit 205 calculates and updates the rate according to a formula of (count value of true/count value of true+count value of false).

When a rule update request is transmitted to the server device 13 side, the rule update unit 212 reads the above-described version information and statistical numeric values of the check results from the check result storage unit 206 and transmits the read version information and statistical numeric values to the server device 13 side.

Also, when the rule is updated, the rule update unit 212 initializes the statistical information about the check results. Specifically, when the check result data is initialized, the rule update unit 212 resets the values of true and false to 0.

At this time, the rule update unit 212 may initialize the statistical information about the check results only for a changed rule.

FIG. 14 is a schematic diagram illustrating an example of data of a rule transmitted from the server device side to the client device side for updating in the present embodiment.

In the present embodiment, the client rule generation unit 314 transmits only a rule selected on the basis of the check result data to the client device 12 side. Among rules illustrated in FIG. 7 (the first embodiment), rules related to the data items empno, ename, and hiredate may be transmitted from the server device side to the client device side. In the present embodiment, only a rule that satisfies a condition based on a predetermined criterion (for example, a rate (a check success rate) is less than 60%) is transmitted from the server device side to the client device side. Here, the client rule generation unit 314 transmits a rule for only hiredate for which the check success rate is less than 60% (see FIG. 13). The client rule generation unit 314 does not transmit rules for the other data items (empno and ename) to the client device 12 side.

FIG. 15 is a schematic diagram illustrating an example of data input from the input screen at the time of a request. As illustrated, this request has input values related to the data items of empno, ename, and hiredate. Because the data of hiredate among these data items does not satisfy the condition that the data format is "YYYY-MM-DD" the check fails.

If input checking is performed with respect to data items of empno, ename, and hiredate of the data illustrated in FIG. 15, the data of empno and ename is determined to be acceptable and the data of hiredate is determined to be rejected. Then, according to this determination result, the check execution unit 205 updates the check result storage unit 206.

According to the present embodiment, it is possible to reduce a processing load of the input checking of the client device side. Even if a computer with little computational resources is used as a client device (for example, Raspberry Pi or the like), it is possible to perform a process without problems.

Next, some modified examples of the second embodiment will be described.

In the first modified example, the rule update unit 212 transmits values less than the threshold value (for example, less than 60%) with respect to all data items as the statistical information about check results to the server device 13 side at a predetermined frequency. In this manner, if the values less than the threshold value are transmitted with respect to all the data items, the server device 13 transmits rules related to all the data items to the client device 12 side. Thereby, it is possible to acquire the statistics of the check results with respect to all the data items at the above-described predetermined frequency.

In the second modified example, unlike in the first modified example, the client rule generation unit 314 of the server device side is configured to transmit the rules related to all the data items to the client device 12 side at a predetermined frequency. Thereby, it is possible to acquire the statistics of the check results with respect to all the data items at a predetermined frequency without being conscious of the client device 12 side.

In the third modified example, a type of data item related to the rule to be transmitted is determined on the basis of statistical information in all client devices 12 collected at the server device 13 side, not on the basis of statistical information about the check results in only a specific client device 12. In other words, the client rule generation unit 314 accumulates statistical information about check results from a side of a plurality of client devices 12 every time the statistical information is received. Then, the client rule generation unit 314 tabulates the statistical information at a predetermined timing, and calculates check success rates of the plurality of client devices 12 as a whole. Then, only rules related to data items with a low check success rate are transmitted to the client devices 12. At the client device 12 side, each rule storage unit 204 is updated with a rule transmitted from the server device 13 side. In this modified example, the check success rate may be determined on the basis of a check result received by the server device 13 from another client device 12 only with respect to a client device 12 having poor statistical information about the check results (for example, the number of check executions is smaller than a predetermined threshold value). In other words, in the present modified example, the client rule generation unit 314 has a means for storing the check result received from the rule update unit 212 of the client device 12 side, generates a rule for another client device 12 with respect to only a data item for which a check success rate is less than a predetermined threshold value as the check result when there is a rule request from the rule update unit 212 in the other client device 12 on the basis of the stored check result, and transmits the generated rule to the other client device 12 which is a request source. Thereby, it is possible to selectively update the rules on the basis of a check result in another client device even in a client device 2 in which the number of executions of the process is small.

In the fourth modified example, the rule update unit 212 does not transmit the check result data to the server device 13 side. Then, the client rule generation unit 314 in the server device 13 transmits rules related to all the data items to the client device 12. At the client device 12 side, the rule update unit 212 refers to the check result storage unit 206 and updates the rule storage unit 204 with only a rule related to a data item for which the check success rate is less than a predetermined threshold value among the received rules. That is, in the present modified example, the rule update unit 212 updates the rule storage unit 204 by using a rule received from the server device 13 side with respect to only a data item for which the check success rate is less than a predetermined threshold value as the check result on the basis of information about the check result read from the check result storage unit 206 when the rule for updating the rule storage unit 204 is received from the server device 13 side. After this updating, the check execution unit 205 checks only data items for which the check success rates are less than the predetermined threshold value selected by the rule update unit 212. Thereby, the processing load on the server device 13 side can be reduced.

In the fifth modified example, the rule update unit 212 transmits the check result data to the server device 13 side. The client rule generation unit 314 in the server device 13 determines whether or not to transmit an update rule on the basis of the statistical information with respect to a data item for which the statistical information about the check results is received from the client device 12. The client rule generation unit 314 determines whether or not to transmit an update rule on the basis of statistical information about a check result collected from another client device 12 with respect to a data item for which the statistical information about the check results is not received from the client device 12.

Although the version information about the rule is the information about the date and time character string in each of the above-described embodiments, another type of version information may be used as long as the version can be identified from the version information.

According to at least one embodiment described above, the rule update unit 202 (or the rule update unit 212) (the same is true hereinafter) may request the server device 3 side to update a rule at any timing. Also, the rule update unit 202 always updates the rule storage unit 204 with a rule transmitted from the server device 3 side. It is possible to centrally manage input check rules at the server device 3 side in an integrated manner by providing such a rule update unit 202. Also, it becomes possible to update a rule stored at the client device 2 side at any timing by appropriately determining the generation of a trigger.

At least some of the functions of the client device and the server device in the above-described embodiment may be implemented by a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system.

While several embodiments of the present invention have been described, these embodiments have been presented by way of example only, and are not intended to limit the scope of the invention. These embodiments may be embodied in a variety of other forms. Various omissions, substitutions and changes may be made without departing from the spirit of the invention. The invention described in the accompanying claims and its equivalents are intended to cover such embodiments or modified examples as would fall within the scope and spirit of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer system including a client device implemented by a computer and a server device implemented by a computer,
   wherein the client device includes:
   a first rule storage unit configured to store a rule related to input checking;
   a first check execution unit configured to check input data on the basis of the rule stored in the first rule storage unit;
   a user interface control unit configured to receive the input data through a user interface;
   a request transmission unit configured to request the first check execution unit to perform the input checking on the input data included in a request for performing transmission to the server device and transmit the request to the server device if a check result is success;
   a rule update unit configured to request the server device to transmit a rule for updating the first rule storage unit on the basis of a predetermined trigger and update the first rule storage unit by using the rule transmitted from the server device as a response to the request; and
   a check result storage unit configured to store information about the check result from the first check execution unit, and
   wherein the server device includes:
   a second rule storage unit configured to store the rule related to the input checking;
   a second check execution unit configured to check the input data on the basis of the rule stored in the second rule storage unit;
   a request reception unit configured to receive the request transmitted from the request transmission unit and request the second check execution unit to perform the input checking on the input data included in the request; and
   a client rule generation unit configured to generate a client rule on the basis of the rule read from the second rule storage unit when a rule request is received from the rule update unit and transmit the generated rule to the client device of a request source,
   wherein the first check execution unit writes the information about the check result of executing the checking to the check result storage unit,
   wherein the rule update unit transmits the information about the check result read from the check result storage unit to the server device simultaneously when requesting the server device to transmit the rule for updating the first rule storage unit, and
   wherein the client rule generation unit in the server device generates the rule for the client with respect to only a data item for which a check success rate is less than a predetermined threshold value as the check result on the basis of the information about the check result received from the rule update unit and transmits the generated rule to the client device of the request source.

2. The system according to claim 1, wherein the client rule generation unit stores the check result received from the rule update unit and generates a rule for another client with respect to only a data item for which a check success rate is less than a predetermined threshold value as the check result to transmit the generated rule to another client device which is a request source when there is a request for the rule from the rule update unit in the other client device on the basis of the stored check result.

3. A computer system including a client device implemented by a computer and a server device implemented by a computer,
   wherein the client device includes:
   a first rule storage unit configured to store a rule related to input checking;
   a first check execution unit configured to check input data on the basis of the rule stored in the first rule storage unit;
   a user interface control unit configured to receive the input data through a user interface;
   a request transmission unit configured to request the first check execution unit to perform the input checking on the input data included in a request for performing transmission to the server device and transmit the request to the server device if a check result is success;
   a rule update unit configured to request the server device to transmit a rule for updating the first rule storage unit on the basis of a predetermined trigger and update the first rule storage unit by using the rule transmitted from the server device as a response to the request; and
   a check result storage unit configured to store information about the check result from the first check execution unit, and
   wherein the server device includes:
   a second rule storage unit configured to store the rule related to the input checking;
   a second check execution unit configured to check the input data on the basis of the rule stored in the second rule storage unit;
   a request reception unit configured to receive the request transmitted from the request transmission unit and request the second check execution unit to perform the input checking on the input data included in the request; and
   a client rule generation unit configured to generate a client rule on the basis of the rule read from the second rule storage unit when a rule request is received from the rule update unit and transmit the generated rule to the client device of a request source,
   wherein the first check execution unit writes information about the check result of executing the checking to the check result storage unit, and
   wherein the rule update unit updates the first rule storage unit by using the rule received from the server device with respect to only a data item for which a check success rate is less than a predetermined threshold value as the check result on the basis of the information about the check result read from the check result storage unit when the rule for updating the first rule storage unit is received from the server device.

4. A client device implemented by a computer comprising:
- a rule storage unit configured to store a rule related to input checking;
- a check execution unit configured to check input data on the basis of the rule stored in the rule storage unit;
- a user interface control unit configured to receive the input data through a user interface;
- a request transmission unit configured to request the check execution unit to perform the input checking on the input data included in a request for performing transmission to a server device and transmit the request to the server device if a check result is success;
- a rule update unit configured to request the server device to transmit a rule for updating the rule storage unit on the basis of a predetermined trigger and update the rule storage unit by using the rule transmitted from the server device as a response to the request; and
- a check result storage unit configured to store information about the check result from the first check execution unit,
- wherein the first check execution unit writes information about the check result of executing the checking to the check result storage unit, and
- wherein the rule update unit updates the first rule storage unit by using the rule received from the server device with respect to only a data item for which a check success rate is less than a predetermined threshold value as the check result on the basis of the information about the check result read from the check result storage unit when the rule for updating the first rule storage unit is received from the server device.

5. A server device implemented by a computer comprising:
- a rule storage unit configured to store a rule related to input checking;
- a check execution unit configured to check input data on the basis of the rule stored in the rule storage unit;
- a request reception unit configured to receive a request transmitted from a client device and request the check execution unit to perform the input checking on the input data included in the request; and
- a client rule generation unit configured to generate a client rule on the basis of the rule read from the rule storage unit when a rule request is received from the client device and transmit the generated rule to the client device of a request source,
- wherein the client rule generation unit generates the rule for the client with respect to only a data item for which a check success rate is less than a predetermined threshold value as the check result on the basis of the information about the check result received from the client device and transmits the generated rule to the client device of the request source.

6. A non-transitory computer readable medium having recorded thereon a program which when executed by a computer causes the computer to function as:
- a rule storage unit configured to store a rule related to input checking;
- a check execution unit configured to check input data on the basis of the rule stored in the rule storage unit;
- a user interface control unit configured to receive the input data through a user interface;
- a request transmission unit configured to request the check execution unit to perform the input checking on the input data included in a request for performing transmission to a server device and transmit the request to the server device if a check result is success;
- a rule update unit configured to request the server device to transmit a rule for updating the rule storage unit on the basis of a predetermined trigger and update the rule storage unit by using the rule transmitted from the server device as a response to the request; and
- a check result storage unit configured to store information about the check result from the first check execution unit,
- wherein the first check execution unit writes information about the check result of executing the checking to the check result storage unit, and
- wherein the rule update unit updates the first rule storage unit by using the rule received from the server device with respect to only a data item for which a check success rate is less than a predetermined threshold value as the check result on the basis of the information about the check result read from the check result storage unit when the rule for updating the first rule storage unit is received from the server device.

7. A non-transitory computer readable medium having recorded thereon a program which when executed by a computer causes the computer to function as:
- a rule storage unit configured to store a rule related to input checking;
- a check execution unit configured to check input data on the basis of the rule stored in the rule storage unit;
- a request reception unit configured to receive a request transmitted from a client device and request the check execution unit to perform the input checking on the input data included in the request; and
- a client rule generation unit configured to generate a client rule on the basis of the rule read from the rule storage unit when a rule request is received from the client device and transmit the generated rule to the client device of a request source,
- wherein the client rule generation unit generates the rule for the client with respect to only a data item for which a check success rate is less than a predetermined threshold value as the check result on the basis of the information about the check result received from the client device and transmits the generated rule to the client device of the request source.

* * * * *